Figure 1:
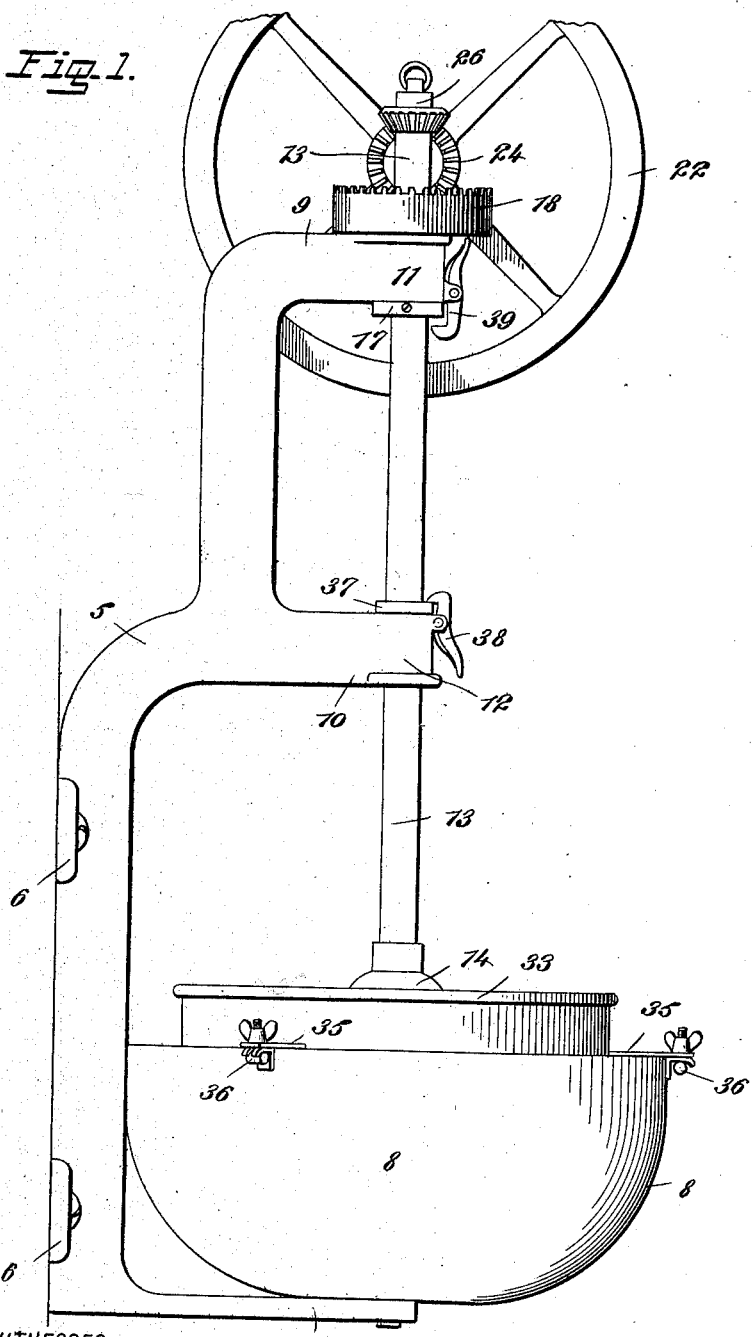

No. 736,161. PATENTED AUG. 11, 1903.
M. SMITH & W. SHERWOOD.
EGG BEATER.
APPLICATION FILED DEC. 5, 1902.
NO MODEL.
2 SHEETS—SHEET 1.

WITNESSES:

INVENTORS
Morris Smith
William Sherwood
BY
ATTORNEYS.

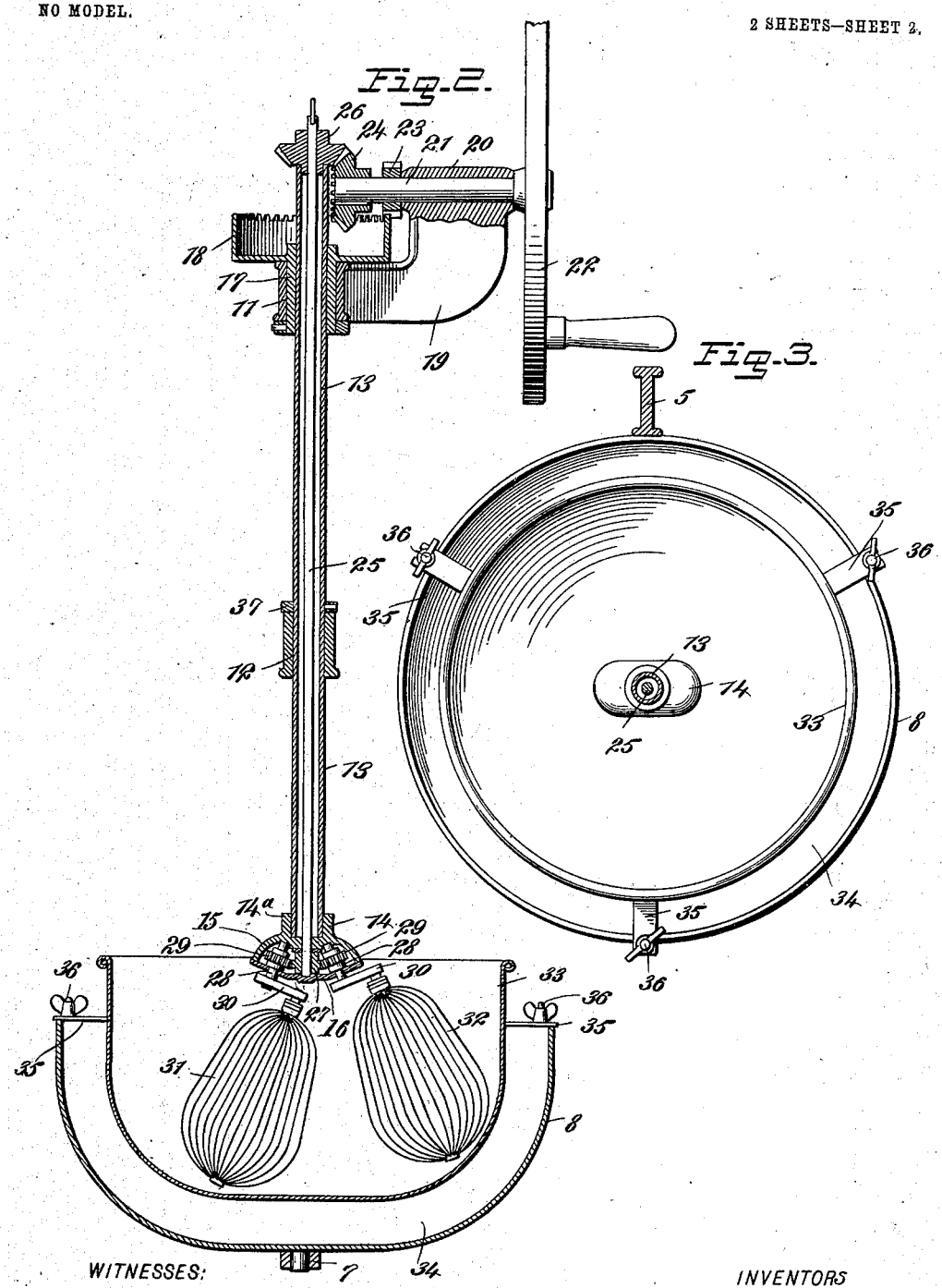

No. 736,161. Patented August 11, 1903.

UNITED STATES PATENT OFFICE.

MORRIS SMITH AND WILLIAM SHERWOOD, OF NEW YORK, N. Y.

EGG-BEATER.

SPECIFICATION forming part of Letters Patent No. 736,161, dated August 11, 1903.

Application filed December 5, 1902. Serial No. 133,936. (No model.)

*To all whom it may concern:*

Be it known that we, MORRIS SMITH and WILLIAM SHERWOOD, both citizens of the United States, and residents of the city of New York, borough of Manhattan, in the county and State of New York, have invented a new and Improved Egg-Beater, of which the following is a full, clear, and exact description.

Our invention relates to improvements in devices for beating eggs, cream, spongy compounds, and other substances; and one object that we have in view is the provision of a simple and efficient device in which the substance may be warmed or cooled during the operation of beating the same.

A further object is to provide means for slowly moving the whips around the container and for rapidly turning the whips on their axes, the slow and fast motion being given simultaneously to the whips in order that they may traverse all parts of the container and thoroughly beat the contents thereof.

A further object is the provision of means by which the beating mechanism may be adjusted bodily in a vertical direction with reference to the container, so as to be out of the way when the vessel is to be withdrawn for emptying the contents thereof.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 1 is a side elevation of our improved egg-beater. Fig. 2 is a vertical sectional elevation of the same; and Fig. 3 is a plan view of the jacketed containing vessel, certain of the parts being shown in horizontal section.

5 designates a vertical frame, which is made in the form of a bracket, having lugs or ears 6, which are adapted to be applied against a wall or other surface and to be secured rigidly in place. At its lower end this vertical frame is provided with a horizontal arm 7, to which is attached a kettle or jacket 8, the latter being of any suitable shape and mounted on the frame by any preferred means. The upper part of the frame 5 is provided with the integral arms 9 10, said arms having suitable bearings 11 12, which are disposed in vertical alinement and in the plane of the vertical axis of the kettle or jacket 8.

13 designates a vertical tubular shaft, which is journaled in the alined bearings 11 12 of the upper frame-arms, and this tubular shaft is provided at its lower extremity with a chambered foot-bearing 14, the latter having a sleeve 14ª, which is secured firmly to said lower extremity of the tubular shaft. This foot-bearing is provided with a chamber 15, which is closed at its under side by a bottom plate 16, attached to the foot-bearing in any suitable way. The upper end of the tubular shaft 13 is prolonged or extended a proper distance above the bearing 11, and on this upper portion of said tubular shaft is secured the sleeve-like hub 17 of a crown-wheel 18, the upper edge of the latter being provided with gear-teeth.

The vertical frame 5 is provided on the arm 9 with an upstanding arm 19, having a bearing 20, which accommodates a horizontal shaft 21. At one end this shaft is provided with a drive-wheel 22, which should be provided with a suitable hand-crank, and the inner portion of said shaft 21 is provided with a spur gear-pinion 23 and a beveled gear-wheel 24, said spur gear-pinion meshing directly with the teeth of the crown-wheel 18 for the purpose of rotating the latter and the tubular shaft. Extending longitudinally through the tubular shaft is a solid shaft 25, the lower extremity of which is stepped or journaled in the foot-bearing 14, while the upper extremity of said internal solid shaft is prolonged a short distance beyond the corresponding end of the tubular shaft 13. The upper end of this internal shaft is provided with a bevel gear-pinion 26, which meshes with the bevel gear-wheel 24 on the shaft 21, and the lower end of said internal shaft 25 is provided with a spur gear-pinion 27, the purpose of which is to drive the whips simultaneously.

28 28 designate short inclined shafts, which are journaled in the foot-bearing 14 on opposite sides of the vertical shaft 25, and these short shafts are provided with spur gear-pinions 29, which mesh directly with the spur gear-pinion 27 on the internal shaft 25, whereby the short shafts are geared directly to the internal shaft to be driven simultaneously thereby in opposite directions. The lower ends of these short shafts protrude below the plate 16 of the foot-bearing and are provided with crank-arms 30, to which are attached the whips 31 32. Said whips are disposed in inclined positions in relation to the plane of the shafts 13 25, and these whips rotate with the shafts 28 under the motion derived from the shaft 25. At the same time the whips and the shafts 28 rotate with the foot-bearing 14, which is carried by the tubular shaft that is driven by the gears 18 23 from the shaft 21; but the motion of the whips with the tubular shaft is quite slow as compared with the rotation of the whips on their axes under the motion derived from the shaft 25.

33 designates a containing vessel which is supported within the jacket or kettle 8 to leave an intermediate chamber or space 34. This containing vessel is removably secured in place, and one means for attaining these ends consists in the provision of horizontal arms 35, attached at suitable intervals to the vessel 33 and arranged to rest upon the upper edge of the jacket 8. The arms 35 carry suitable clamps 36, which engage with the kettle 8 and hold the vessel 33 removably in position.

The tubular shaft 13 is capable of a slidable adjustment through the alined bearings 11 12 and the hub 17 of the crown-wheel, said hub 17 being keyed or fastened removably to the tubular shaft. The vertical adjustment of the tubular shaft carries with it the foot-piece 14, the internal shaft 25, and the bevel gear-pinion 26, and with this foot-piece 14 move the shafts 28 and whips 31 32, whereby the beating mechanism may be raised out of the vessel 33 in order to remove said vessel from the kettle when it is desired to empty the contents of the vessel. The tubular shaft 13 is provided with a collar 37, which in the lowered position of the feeding mechanism is adapted to rest upon the arm 10, thus enabling a latch 38 to engage with the collar and hold the shaft and the other coöperating parts in their lowered active positions. This latch 38 is mounted on the bearing 12 of the arm 10, and on the upper bearing 11 of the arm 9 is mounted another latch 39, the same lying in the path of the collar 37 and arranged to engage with said collar when the shaft and the beating mechanism are raised.

In operation the eggs, cream, or sponge may be easily placed in the vessel 33. If cream is to be whipped, cold water can be placed in the chamber 34 to keep the cream at a low temperature; but if sponge is to be subjected to the action of whips it is desirable to place warm water in the chamber 34 in order to raise the temperature of the substance. The crank-wheel 22 drives the gearing by which the shafts 13 25 are rotated at different speeds, and the whips will turn slowly with the shaft 13 and the foot-piece in order to present the whips to all portions of the vessel 33. At the same time the whips will turn rapidly on their axes, because the shafts 28 are geared to the shaft 25, which is propelled at a faster speed than the shaft 13.

Having thus described our invention, we claim as new and desire to secure by Letters Patent—

1. In a beater of the class described, the combination of concentric shafts, means for driving the shafts at different speeds, and whips arranged to be carried in an orbit with the slow-speed shaft and geared to the high-speed shaft to turn rapidly on their axes.

2. A beater of the class described, comprising concentric shafts, a foot-piece carried by one of said shafts, other shafts mounted in the foot-piece and geared to the internal shaft, whips carried by the short shafts, and means for driving the concentric shafts at different speeds.

3. A beater of the class described, having a series of whips, means for imparting an orbital movement at a certain speed to the whips simultaneously, means for rotating the individual whips on their axes at a speed in excess of the orbital speed, and a vessel adapted to be traversed by the whips.

4. A beater of the class described, comprising a framework, a hollow shaft journaled therein and adapted to be adjusted longitudinally, a gear splined on the shaft, an internal shaft mounted in and adjustable endwise with said hollow shaft, a gear-pinion on the internal shaft, a driving-shaft having gears adapted to mesh with said gear and the gear-pinion respectively on the hollow and internal shafts, and beaters supported by the hollow shaft and geared to the internal shaft.

5. A beater of the class described, comprising a containing vessel, a tubular shaft provided with a foot-piece, short shafts mounted in said foot-piece to have orbital movement therewith and provided with cranks, whips attached to said cranks of the short shafts, an internal shaft extending through the tubular shaft, and means for simultaneously rotating the tubular and internal shafts.

6. A beater of the class described, comprising a frame, a vessel, a hollow shaft mounted in said frame for adjustment relative to the vessel, an internal shaft movable endwise with the hollow shaft and revoluble independently thereof, a beating mechanism carried by the hollow shaft and geared to the internal shaft, means for driving the shafts, and separate locking devices mounted on the frame and adapted to engage the hollow shaft to lock it against endwise movement in the raised or lowered positions thereof.

7. A beater of the class described, comprising a frame carrying a containing vessel, a vertical shaft journaled in the frame and provided with a foot-piece, short shafts journaled in the foot-piece and carrying inclined whips, an internal shaft geared to said short shafts, and a driving-shaft geared independently to the vertical and to the internal shafts to rotate them at different speeds.

In testimony whereof we have signed our names to this specification in the presence of two subscribing witnesses.

MORRIS SMITH.
    WILLIAM SHERWOOD.

Witnesses:
 WILLIAM SHERWOOD, Jr.,
 CHAS. A. HALL.